(12) United States Patent
Heinonen (10) Patent No.: US 11,468,593 B2
(45) Date of Patent: Oct. 11, 2022

(54) METHOD AND SYSTEM FOR CREATING GROUND CONTROL POINT WITHIN SPATIAL AREA

(71) Applicant: AI4 International Oy, Helsinki (FI)

(72) Inventor: Tero Heinonen, San Francisco, CA (US)

(73) Assignee: AI4 INTERNATIONAL OY, Helsinki (FI)

( * ) Notice: Subject to any disclaimer, the term of this patent is extended or adjusted under 35 U.S.C. 154(b) by 447 days.

(21) Appl. No.: 16/745,852

(22) Filed: Jan. 17, 2020

(65) Prior Publication Data
US 2022/0284669 A1 Sep. 8, 2022

(51) Int. Cl.
*G06T 7/73* (2017.01)
*G06T 7/33* (2017.01)
*G06V 20/13* (2022.01)

(52) U.S. Cl.
CPC ............ *G06T 7/73* (2017.01); *G06T 7/33* (2017.01); *G06V 20/13* (2022.01)

(58) Field of Classification Search
CPC .............. G06T 7/73; G06T 7/33; G06V 20/13
See application file for complete search history.

(56) References Cited

U.S. PATENT DOCUMENTS

| 7,343,051 B1 * | 3/2008 | Hsu ................. G06V 20/13 382/284 |
| 9,606,217 B2 * | 3/2017 | Bruemmer ........... G01S 5/0009 |
| 11,055,894 B1 * | 7/2021 | Kreter ................ G08G 1/0116 |

* cited by examiner

*Primary Examiner* — Paulos M Natnael
(74) *Attorney, Agent, or Firm* — Ziegler IP Law Group, LLC (57) ABSTRACT

A method for creating ground control point within a spatial area, includes generating first and second geospatial dataset by measuring characteristics of a plurality of objects present within the spatial area. A first feature associating with a first object is detected from the measured characteristics of plurality of objects within first geospatial dataset and a first location co-ordinates is associated for the first feature. The first feature associating with the first object is further detected from measured characteristics of plurality of objects within second geospatial dataset and a second location co-ordinates is associated for the first feature. Level of accuracy is calculated for the first feature of the first object using the first and the second location co-ordinates. First feature of the first object is designated as the ground control point. The ground control point and the level of accuracy for the first feature are stored.

15 Claims, 6 Drawing Sheets

METHOD AND SYSTEM FOR CREATING GROUND CONTROL POINT WITHIN SPATIAL AREA

TECHNICAL FIELD

The present disclosure relates generally to trajectory estimation and georeferencing related technologies; and more specifically, to methods and systems for creating a ground control point within a spatial area.

BACKGROUND

Typically, ground control points are marked targets on the ground, usually spaced strategically throughout an area of interest. The ground control points are mostly needed in certain environments, such as in urban, forest, and mountainous areas, where there are limitations in global navigation satellite system signal reception. Because without accurate ground control points (even in case of advanced methods, such as using global navigation satellite system correction and enhancements), the accuracy of positioning may not be enough or accurate. Moreover, in such environments, the creation of ground control points is most difficult, cost intensive, and a very slow process. In an example, a survey equipment used to establish the ground control points may not position accurately in a thick forest as there is no satellite fix readily available in such environment. In another example, it may be required for the survey equipment to travel to a desired location for surveying. However, the desired location may be physically inaccessible, for example, no roads or trails to physically travel to the desired location, such as in case of mountain slopes or dense forest. Thus, additional time, costs, and efforts may be incurred based on a level of difficulty encountered in accessing such locations.

The ground control points may be natural or man-made objects in the environment, the location of which needs to be established accurately by surveying. The suitability of selection of naturally occurring and man-made objects varies depending on the object in terms of: ease of detection and identification of a given object from remote sensing data, an accuracy of detection of the given object from the remote sensing data, an invariance of the object, an invariance in the measurement of the given object, and finally, a permanence of the object. All of these properties impact how useful the given object might be to be considered ground control point. In an example, trees and vegetation grows (e.g. their shape varies based on a time of day, humidity, temperature), so such objects may not be usable for ground control points. In another example, road surfaces may erode or undergo deterioration. Similarly, road markings may be repainted, fade over time, or may be covered by snow, thereby causing errors if used as a ground control point. In yet another example, it may be technically challenging to distinguish among natural objects (e.g. similar type of trees) if used as ground control points. Moreover, there are very few man-made objects outside urban and road networks, thus a limited number of objects are available to be considered for use as ground control points. Moreover, creation of more ground control points means higher costs. For example, in a project site, such as a "10" mile oil and gas pipeline corridor, about 2 ground control points may be required at each end and a few ground control points may be required along the way. The number, placement, and type of ground control points may vary based on the accuracy requirements and the physical realities (e.g. location, accessibility, geography, or geometry) of the project site. A typical number of ground control points per mile may vary between 0.1 to 20 depending on the physical realities of the project site. Thus, in case of a project site covering 100,000 miles, about 0.5 million ground control points may be required to be manually created, which may be very expensive, tedious, and slow process, using conventional methods and systems. Thus, it can be estimated that the cost for creation of ground control points in such cases may approximately approach even the cost of remote sensing project, effectively almost doubling the overall cost, which is prohibitive and undesirable.

Traditionally, ground control points are established by a surveyor utilizing a survey equipment having measuring devices that can measure its positioning with a certain accuracy limit. In an example, such measuring devices include high precision global navigation satellite systems and total stations. Typically, a total station consists of a theodolite with a built-in distance meter, which allows simultaneous measurement of angles and distances, and determine the positions and heights of points (i.e. in objects). Such survey equipment is operated by professional surveyors, and the process of establishing ground control points based on manual surveying techniques, is thus very time consuming, expensive, tedious, and error-prone. Moreover, the environment issues and the accessibility issues, as discussed above, and the like, further increases the difficulty in accurate creation of ground control points. Furthermore, the use of measuring devices, for example, an inertial measurement unit, is known in applications, such as estimating a trajectory, for example, of a vehicle carrying such measuring devices. However, in certain scenarios, for example, where there are limitations in global navigation satellite system signal reception, the inertial measurement unit starts drifting without corrections. As a result, the uncertainty of measured positions may become very large, for example, greater than 100 meters, which renders positioning and remote sensing data unusable using conventional methods and systems.

Therefore, in light of the foregoing discussion, there exists a need to overcome the aforementioned drawbacks associated with conventional methods of creation of ground control points in a spatial area.

SUMMARY

The present disclosure seeks to provide a method for creating a ground control point within a spatial area. The present disclosure also seeks to provide a system for creating a ground control point within a spatial area. The present disclosure seeks to provide a solution to the existing problem of inaccurate, cost intensive, and very slow process of creating ground control points within a spatial area using conventional methods and systems. An aim of the present disclosure is to provide a solution that overcomes at least partially the problems encountered in prior art, and provide an improved method and system that enables automated creation of ground control points within a spatial area in a time efficient, cost-effective, accurate, and reliable manner.

In one aspect, an embodiment of the present disclosure provides a method for creating a ground control point within a spatial area, the method comprising:

generating a first and a second geospatial dataset by measuring a characteristics of a plurality of objects present within the spatial area;

detecting a first feature associating with a first object from the measured characteristics of the plurality of objects within the first geospatial dataset and associating a first location co-ordinates for the first feature;

detecting the first feature associating with the first object from the measured characteristics of the plurality of objects within the second geospatial dataset and associating a second location co-ordinates for the first feature;

calculating a level of accuracy for the first feature of the first object by using the first location co-ordinates and the second location co-ordinates;

designating the first feature of the first object as the ground control point; and storing the ground control point and the level of accuracy for the first feature of the first object.

In another aspect, an embodiment of the present disclosure provides a system for creating a ground control point within a spatial area, the system comprises a data collecting device comprising a data collecting means; a server; a processor, wherein the processor is configured to:

generate a first and a second geospatial dataset by measuring a characteristics of a plurality of objects present within the spatial area;

detect a first feature associating with a first object from the measured characteristics of the plurality of objects within the first geospatial dataset and associating a first location co-ordinates for the first feature;

detect the first feature associating with the first object from the measured characteristics of the plurality of objects within the second geospatial dataset and associating a second location co-ordinates for the first feature;

calculate a level of accuracy for the first feature of the first object by using the first location co-ordinates and the second location co-ordinates;

designate the first feature of the first object as the ground control point; and store, the ground control point and the level of accuracy for the feature of the first object.

Embodiments of the present disclosure substantially eliminate or at least partially address the aforementioned problems in the prior art, and enable automated creation of a ground control point for a spatial area with an increased level of accuracy as compared to conventional methods. Moreover, the method provides a faster, more scalable, and a cost-effective solution as compared to conventional methods to provide accurate ground control points, which in turn results in accurate and cost-effective remote sensing and trajectory estimation, for example, for the data collecting device (such as a vehicle).

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for creating a ground control point within a spatial area, the method comprising:

generating a first and a second geospatial dataset by measuring a characteristics of a plurality of objects present within the spatial area;

detecting a first feature associating with a first object from the measured characteristics of the plurality of objects within the first geospatial dataset and associating a first location co-ordinates for the first feature;

detecting the first feature associating with the first object from the measured characteristics of the plurality of objects within the second geospatial dataset and associating a second location co-ordinates for the first feature;

calculating a level of accuracy for the first feature of the first object by using the first location co-ordinates and the second location co-ordinates;

designating the first feature of the first object as the ground control point; and storing the ground control point and the level of accuracy for the first feature of the first object.

In another aspect, an embodiment of the present disclosure provides a system for creating a ground control point within a spatial area, the system comprises a data collecting device comprising a data collecting means; a server; a processor, wherein the processor is configured to:

generate a first and a second geospatial dataset by measuring a characteristics of a plurality of objects present within the spatial area;

detect a first feature associating with a first object from the measured characteristics of the plurality of objects within the first geospatial dataset and associating a first location co-ordinates for the first feature;

detect the first feature associating with the first object from the measured characteristics of the plurality of objects within the second geospatial dataset and associating a second location co-ordinates for the first feature;

calculate a level of accuracy for the first feature of the first object by using the first location co-ordinates and the second location co-ordinates;

designate the first feature of the first object as the ground control point; and store, the ground control point and the level of accuracy for the feature of the first object.

The present disclosure provides the method and the system for creating one or more ground control points within the spatial area. The disclosed method is capable of detecting certain features associating with a given object from the measured characteristics of the plurality of objects. The method automatically identifies correct objects, specifically correct features of objects already present in the environment as ground control points. For example, as the level of accuracy for the first feature of the first object is first calculated, the designation of the first feature of the first object as the ground control point is very accurate. The accurately designated ground control points are used, for example, for estimating a trajectory of the aforementioned data collecting device (e.g. a remote sensing platform, such as a vehicle). The more accurate and cost-effective are the ground control points, the more accurate and cost-effective is the trajectory estimation. Moreover, as and when new data sets become available (e.g. second geospatial dataset or subsequent geospatial datasets), the ground control points, which are no longer available or accurate enough, are removed, thereby further increasing accuracy in the creation (or designation) of the ground control points. Furthermore, the disclosed method and system requires almost little to no human intervention, and the end-to-end ground control point creation process is fast, robust, computationally light, and hence, efficient.

The present disclosure provides the method for creating the ground control point within the spatial area. Herein, the ground control point (namely, GCP) refers to point on a surface, wherein the said surface forms the spatial area. It will be appreciated that the ground control point is essential for georeferencing of the said spatial area. It will be appreciated that the points forming the ground control points (GCPs) for the spatial area may have varied geometry. Therefore, the ground control points are not limited to flat markings or horizontal plates, but should be broadly construed to include edges of an object, intersection of two or more objects, changes in direction of surface (for example, diversion on a road), and so forth. Additionally, the spatial area refers to an area of interest for with georeferencing is to be created. Specifically, the spatial area refers to a geographical area or a terrain comprising the plurality of objects. Examples of the spatial area include, but are not limited to, coastal area, island, forest area, dense urban area, desert regions, or any geographical area of interest.

It will be appreciated that the plurality of objects comprised in the spatial area are identified to form the ground control points for the said spatial area. Notably, the plurality of objects are real-world physical entities that are visible (e.g. by the data collecting means). Examples of the plurality of objects include, but are not limited to, trees, buildings, check posts, electric poles, fence, and man-made marks (for example, arrows, cross, symbols, and the likes).

The method for creating the ground control point within the spatial area is implemented via the system comprising the data collecting device, the server and the processor. Notably, the data collecting device refers to remote sensing platform (for example, a vehicle) that is operable to travel on a given route (namely, a planned route) in the spatial area. Specifically, the data collecting device is operable to collect the first and the second geospatial dataset from the spatial area while traveling therein. It will be appreciated that a user of the system previously perform steps such as planning of location of tentative ground control points, access the spatial area, measure the spatial area, record the measurements and tentative ground control points, and further validate the measurements and tentative ground control points along with logistics between the spatial area (for example, no access, limited access, nature of terrain of the spatial area, and the like). Subsequently, such previously performed steps enable the user to develop the planned route for the data collecting device. In other words, the planned route for the data collecting device is defined previously based on speculative and preliminary investigation of the spatial area. Moreover, optionally, the planned route of the data collecting device comprises geographical co-ordinates for the spatial area. Examples of the data collecting device include, but is not limited to, automotive vehicle (for example, cars, jeeps, and so forth), locomotive vehicle (for example, railway vehicles, wagons, and so forth), aerial vehicle (for example, aircrafts, and unmanned aerial vehicles, such as drones, and so forth), and marine vehicle. In an example, the data collecting device in an automotive vehicle, for example, a car.

Optionally, the planned route for the data collecting device is provided to the data collecting device by at least one of: the server, a user of the system. Moreover, in an example, the planned route is potentially the forecasted route to be followed by the data collecting device. Moreover, optionally, the user of the system is a person or a bot having knowledge of the georeferencing, geographical co-ordinates and/or satellite systems. The user is, for example, a professional surveyor, an explorer, a route development manager, an operator and the like.

Moreover, the server refers to a structure and/or a module that include programmable and/or non-programmable components configured to store, process and/or share information. Optionally, the server includes any arrangement of physical or virtual computational entities capable of enhancing information to perform various computational tasks. Furthermore, it will be appreciated that the server may be both single hardware server and/or plurality of hardware servers operating in a parallel or distributed architecture. In an example, the server may include components such as memory, a processor, a network adapter and the like, to store, process and/or share information with other computing components, such as user device. Optionally, the server is implemented as a computer program that provides various services (such as database service) to other devices, modules or apparatus.

Additionally, the processor refers to a computational element that is operable to respond to and processes instructions that drive the system. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that may be shared by other processing devices. Additionally, the one or more individual processors, processing devices and elements are arranged in various architectures for responding to and processing the instructions that drive the system.

Optionally, the processor is at least one of: a processor of the data collecting device, a processor arranged in the server, a separate processor arrangement connected to the system. In this regard, the processor that is configured to perform the steps of the method that drive the system is at least one of: the processor associated with the data collecting device, the processor associated with the server, an independent processor arrangement of the system. In an embodiment, data collecting means (as discussed later, herein) of the data collecting device comprise a processor, wherein the said processor is operable to perform steps of the method. In another embodiment, the processor associated with and/or arranged within the sever is operable to perform the steps of the method. In yet another embodiment, the system comprises the independent processor that is operable to perform the steps of the method.

The data collecting device comprises the data collecting means. The data collecting means refer to a component or an instrument that is operable to measure characteristics of the plurality of objects of the spatial area. The data collecting means is operable to generate the first and the second geospatial dataset based on travel of the data collecting device into the spatial region in accordance with the planned route. It will be appreciated that an actual route followed by the data collecting device varies with respect to the planned route. Therefore, the data collecting means operates to measure characteristics of the plurality of objects of the spatial area based on the actual route travelled by the data collecting device. Optionally, the data collecting means comprise one or more sensor arrangements operable to measure the characteristics of the plurality of objects in the spatial area. More optionally, the data collecting means is configured to communicate with satellites, the server and so forth to measure the characteristics of the plurality of objects.

Optionally, the data collecting means comprises at least one of: a ground navigation satellite system receiver, a Lidar, camera, an inertial measurement unit of the data collecting device. Therefore, the measuring comprises utilizing, a measurement from at least one of a data collecting means: a ground navigation satellite system receiver, Lidar, camera, an inertial measurement unit of the data collecting device. Specifically, the ground navigation satellite system receiver is configured to receive Global Navigation Satellite System (GNSS) signals from, for example, GNSS satellites. Herein, the received GNSS signals transmitted by satellites are processed in association with ground navigation satellite system receiver's information (for example, receiver's computed position, velocity and time). Optionally, the ground navigation satellite system receiver is a GNSS receiver. Beneficially, the ground control points (GCP) identified by the processor are utilized to correct the GNSS signals provided by the satellites. It will be appreciated that the ground navigation satellite system receiver utilises satellites to receive autonomous geo-spatial positioning from ground level. Optionally, the ground navigation satellite system receiver includes, but not limited to, a global positioning system (GPS), a Global Navigation Satellite System (GLO-NASS), a Galileo Public Regulated Service (PRS), a BeiDou Navigation Satellite System (BDS), or other regional navigation satellite systems.

Moreover, the Light Detection and Ranging (LIDAR) refers to a remote sensing device that uses light in form of pulsed or continuous laser to measure characteristics associated with the plurality of objects, specifically, distances between the data collecting device and each of the plurality of objects. It will be appreciated that the LIDAR operates on principles of radar, wherein the LIDAR transmits light pulses or a waveform and further calculates the distance based on received light pulses reflected from the plurality of objects. Furthermore, Inertial Measurement Unit (IMU) refers to an electronic device that tracks location and/or movement of the data collecting device in the spatial area by employing a plurality of measurement sensors such as an accelerometer, the LIDAR sensor, and the like. Additionally, the camera is operable to capture pictorial representation of at least one of: the plurality of objects in the spatial are, the actual route followed by the data collecting means, the planned route provided to the data collecting means, an environment of the spatial area. The camera may be a two-dimensional (2D) camera, a 3D camera, an infrared camera, and the like. It will be appreciated that the plurality of sensors (for example, the LIDAR, the IMU, the accelerometer, the ground navigation satellite system receiver) and the camera are arranged strategically on or in the data collecting means in order to enable the plurality of sensors and the camera to accurately measure characteristics of the plurality of object.

In an implementation, a vehicle is a remote sensing platform carrying the data collecting device. In another implementation, the vehicle itself is the data collecting device. In an example, the data collecting device is a self-driven vehicle, wherein the self-driven vehicle comprises the GNSS receiver, the camera, the Lidar, and the inertial measurement unit for tracking the actual route followed by the self-driven vehicle.

The method comprises generating, using the processor, the first and the second geospatial dataset by measuring the characteristics of the plurality of objects present within the spatial area. It will be appreciated that the data collecting means measure the characteristics of the plurality of objects, where the plurality of objects are entities occurring or present in the actual route travelled by the data collecting device. Optionally, the data collecting means identifies an entity as an object and further captures physical characteristics (e.g. using LIDAR, camera, etc.) thereof. Moreover, the geospatial dataset is generated by the processor based on georeferencing of each of the plurality of objects in conjunction with characteristics thereof. Specifically, the geospatial dataset refers to a dataset that comprise information relating to the plurality of objects in conjunction with a geographical location associated therewith. It will be appreciated that the characteristics of the plurality of objects are measured by the data collecting means when the data collecting device travels in the spatial area. Moreover, the characteristics associated with the plurality of objects include, for example, physical characteristics of the plurality of objects (such as, shape, size, colour, height, width, colour, spectral reflectance, spectral absorbance and the like), geometry of the plurality of objects, orientation of the plurality of objects, position of the plurality of objects, and geographical locations of the plurality of objects.

Furthermore, the data collecting device is made to travel in the spatial area at least twice in order to collect the two geospatial datasets. It will be appreciated that the first geospatial dataset is generated based on measured characteristics of the plurality of objects at a time interval T1; and the second geospatial dataset is generated based on measured characteristics of the plurality of objects at a time interval T2. Herein, the time interval T1 and the time interval T2 are non-overlapping time intervals. Optionally, the time interval T2 is subsequent to the time interval T1.

Optionally, the data collecting means provide the measure characteristics of the plurality of objects to the server, wherein the processor communicably coupled to or arranged within the server operates to generate the first and the second geospatial dataset.

In an example, first set of characteristics associated with the plurality of objects are measured at a time interval T1, wherein at the time interval T1, the data collecting device travels towards inside of the spatial area from outside the spatial area. Subsequently, the first set of characteristics is employed by the processor to generate the first geospatial dataset. Moreover, second set of characteristics associated with the plurality of objects are measured at a time interval T2, wherein at the time interval T2, the data collecting device travels towards outside of the spatial area from inside the spatial area. Subsequently, the second set of characteristics is employed by the processor to generate the second geospatial dataset.

In another example, first set of characteristics associated with the plurality of objects are measured at a time interval T1, wherein at the time interval T1, the data collecting device travels towards inside of the spatial area from outside the spatial area on a day D1. Subsequently, the first set of characteristics is employed by the processor to generate the first geospatial dataset. Moreover, second set of characteristics associated with the plurality of objects are measured at a time interval T2, wherein at the time interval T2, the data collecting device travels towards inside of the spatial area from outside the spatial area on a day D2 subsequent to the day D1. Subsequently, the second set of characteristics is employed by the processor to generate the second geospatial dataset.

It will be appreciated that the data collecting device may be made to travel the spatial area more than twice. Therefore, the data collecting means measures subsequent sets of characteristics in order to enable the processor to generate subsequent geospatial datasets.

Additionally, the method comprises detecting, using the processor, the first feature associating with the first object from the measured characteristics of the plurality of objects within the first geospatial dataset and associating the first location co-ordinates for the first feature. It will be appreciated that each of the plurality of objects have a corresponding location and a set of measured characteristics associated therewith. Subsequently, for the first object from the plurality of objects, the processor is configured to detect the first feature from the set of measured characteristics associated with the first object. Notably, the first feature of the first object refers to a characteristic of the first object from the set of measured characteristics associated with the first object. It will be appreciated that the first feature is employed as a distinguishing characteristic for the first object from objects surrounding the first object. Herein, the first feature is detected from the set of measured characteristics, for the first object, stored in the first geospatial dataset. In an example, the first object is a building, specifically, a nameplate attached to the building. In such case, the first feature associated with the first object is a name of the building, specifically, textual and/or graphical presentation on the nameplate of the building. In another example, the first object is a tree. In such case, the first feature associated with first object is a type of the tree, a height of the tree or a mark on the tree. It will be appreciated that said tree is identified as the first object if the tree is distinguishable from other trees in the surrounding. In another example, the first object is a telecommunication tower. In such case, the first feature associated with first object is a bottom attachment bracket of an antenna directed to south, or the tip of the tower. In yet another example, the first object is a residential house. In such case, the first feature is the top left corner of the garage door. In another example, the object is a pedestrian crossing. In such case, the first feature is the geographic middle of the northernmost "zebra" marking.

Subsequently, the first location co-ordinates corresponding to the first object is associated with the first feature of the first object. Therefore, the first feature of the first object comprises at least one measured characteristic associated with the first object, geographical location of the first object and a first time interval associated with acquiring the measured characteristics and the geographical location associated with the first object. Similarly, a distinguishing feature is detected for each of the plurality objects, wherein the processor employs first geospatial dataset to generate the distinguishing feature for each of the plurality of objects.

The method comprises detecting, using the processor, the first feature associating with the first object from the measured characteristics of the plurality of objects within the second geospatial dataset and associating the second location co-ordinates for the first feature. Specifically, the first feature of the first object comprises characteristics of the first object at a first time interval. Moreover, the processor detects the first feature associated with the first object within the second geospatial dataset, wherein the second geospatial dataset comprises measured characteristics at a second time interval T2. In other words, the processor operates to detect the first object from the second geospatial dataset using the first feature, associated with the first object, detected from the first geospatial dataset. Subsequently, the processor operates to associate the second location co-ordinates with the first feature. Herein, the second location co-ordinates refer to a geographical location associated with the first feature in the second geo-spatial dataset measured at the second time interval T2. Similarly, the processor is operable to detect distinguishing feature associated with each of the plurality of objects, identified from the first geospatial dataset, within the second geospatial dataset thereby enabling identification of the plurality of objects from the first geospatial dataset and the second geospatial dataset. Subsequently, second location co-ordinates are associated with distinguishing feature of each of the plurality of objects, wherein the second location co-ordinates are based on geographical location recorded in the second geospatial dataset.

It will be appreciated that each of the plurality of objects are identified based on measured characteristics associated therewith. Moreover, a characteristic from a set of measured characteristics for an object (namely, the first object), in the first geospatial dataset, is detected as the distinguishing feature (namely, first feature) for the object. Moreover, first location co-ordinates are associated with the first feature of the first object based on geographical location recorded in the first geospatial dataset during time interval T1. Moreover, the processor operates to detect the first feature of the first object within the second geospatial dataset thereby identifying the first object in the second geospatial dataset. Additionally, second location co-ordinates are associated with the first feature of the first object to specify a geographical location of the first object during time interval T2.

Furthermore, the method comprises calculating the level of accuracy for the first feature of the first object by using the first location co-ordinates and the second location co-ordinates. Notably, the level of accuracy refers to an extent of reliability of the first feature of the first object. In this regard, if the first location co-ordinates associated with the first feature of the first object is same or substantially same as the second location co-ordinates of the first feature, then the level of accuracy of the first feature is said to be high. Optionally, the first location co-ordinates and the second location co-ordinates of the first feature of the first object are employed to determine at least one of: a position of the first object, a change in position of the first object, presence of the first object. Subsequently, the level of accuracy of the first feature is determined based on the aforementioned parameters. It will be appreciated that permanence of the first feature of the first object defines a higher level of accuracy.

Optionally, the level of accuracy is determined using the characteristics of the first object or the characteristics of the first feature. In an example, if the first object is a utility pole. In such case, a predefined level of accuracy is known for utility poles. Herein, the predefined level of accuracy is combined with the first and the second location co-ordinates of the utility pole for determination of the level of accuracy for the utility pole. In another example, the first feature is a distinguished point on a marking on the road. In such case, a predefined level of accuracy is known for road markings specific to a geographical area associated with the road marking. Moreover, the said predefined level of accuracy is combined with the first and the second location co-ordinates of the road marking to determine the level of accuracy therefor.

Optionally, the level of accuracy is at least one of: a numeric score, a probability distribution, an alphabetic score, an alphanumeric score. In an embodiment, the level of accuracy is a numeric score defined in a range between '0' and '1'. In another embodiment, the level of accuracy is determined as 10% of probability of 0.01 meter accuracy, 25% of probability of 0.10 meter accuracy, and 90% of probability of 1.5 meter accuracy.

In another embodiment, the level of accuracy is defined as a difference between first location co-ordinates of a first feature of an object and second location co-ordinates associated thereto. In yet another embodiment, the level of accuracy is defined as a numerical score in a range of '0%' to '100%'. In an example, the first object is a rock and the first feature is a height of the rock. In such case, the level of accuracy is defined based on two geospatial datasets comprising first location co-ordinates of the rock, second location co-ordinates of the rock and measure of height of the rock at a first time interval and a second time interval. Also, in such example, if the rock has been defaced, destructed, or displaced due to a landslide, during the second time interval, then the level of accuracy for the rock decreases. More optionally, the processor assigns the level of accuracy to each of the plurality of objects and further stores the plurality of objects along with corresponding set of measured characteristics, first feature, first location co-ordinates, second location co-ordinates, and level of accuracy in a database associated with the processor and/or the server.

Optionally, the method further comprises:
comparing the level of accuracy for the first feature of the first object with a pre-defined threshold range;
based on the comparison, assigning a statistical weight, to the ground control point, wherein the statistical weight corresponds to a difference between the level of accuracy and the pre-defined threshold.

In this regard, the pre-defined threshold range refers to a level (such as, a magnitude) that enables identification of a feature of an object as a probable ground control point. Notably, the processor compares the level of accuracy of the first feature of the first object with the pre-defined threshold range. It will be appreciated that level of accuracy corresponding to first feature of each of the plurality of objects is compared with the pre-defined threshold range to determine probable ground control points. Optionally, the pre-defined threshold is dynamically determined by the processor and/or assigned by a user of the system. Subsequently, upon comparison of the level of accuracy, the statistical weight is generated for each of the plurality of objects. Optionally, the statistical weight for the first feature of the first object is a difference between the level of accuracy of the first feature and the pre-defined threshold. It will be appreciated that higher the statistical weight, higher is the reliability of first feature, thus object, corresponding thereto. Optionally the statistical weight is a scalar value, a range or a value distribution. Additionally, optionally, the processor stores statistical weight corresponding to each of the plurality of objects along with additional information (such as, set of measured characteristics, first feature, first location co-ordinates, second location co-ordinates, level of accuracy, and the like) associated therewith, in a database associated with the processor.

In an embodiment, for a numeric range of the level of accuracy between '0' and '1', the pre-defined threshold range is '0.5'. In such case, for a first feature of an object having level of accuracy '0.7', the statistical weight is '+0.2'. In another example, when the level of accuracy is defined as a difference between first location co-ordinates of a first feature of an object and second location co-ordinates associated thereto, then the pre-defined threshold range is '10 centi-metres (cm)'. In this regard, a first feature of an object having more than '20 cm' difference between first location co-ordinates and second location co-ordinates of the first feature of the object has a statistical weight of '−10 cm'.

Optionally, processor performing the steps of the method is implemented as a processor of the server, wherein the processor of the server receives information (such as, plurality of objects, set of measured characteristics associated with the plurality of objects, first location co-ordinates associated with the plurality of objects, and second location co-ordinates associated with the plurality of objects) from the data collecting means of the data collecting device. Furthermore, the processor of the server detects the first feature for the plurality of objects and further determines the level of accuracy and statistical weight for the plurality of objects. Moreover, the processor stores the information with corresponding first feature, level of accuracy and statistical weight in a database associated with the server.

Optionally, the method further comprising, removing the stored ground control point, if at least one of:
the first feature of the first object is absent from the second geospatial datasets, or
the level of accuracy associated with the first feature is less than the pre-defined threshold.

In this regard, the processor is operable to remove the non-reliable (or inaccurate) objects from the list of plurality of objects that constitute potential ground control points for the spatial area. Herein, removing an object refers to deleting the object, specifically, information associated with the object, from a database storing the list of plurality of objects and/or the said information. Beneficially, filtering out the non-reliable objects from the plurality of objects enable identification of accurate ground control points. Moreover, the non-reliable objects to be removed are defined based on level of accuracy and/or location co-ordinates associated therewith. Specifically, if the processor fails to detect the first feature of the first object in the second geospatial dataset, then the first object is removed owing to temporary nature of the first object. Moreover, if the level of accuracy of the first feature of the first object is less than the pre-defined threshold then the first object is removed (namely, deleted) from the list of plurality of objects owing to mobile or not-fixed nature thereof.

The method comprises designating the first feature of the first object as the ground control point. Specifically, the first feature of the first object is designated as the ground control point for the spatial area if the level of accuracy thereof is up to a desired level. More specifically, objects from the plurality of objects having level of accuracy higher than the pre-defined threshold range are designated as ground control points. It will be appreciated that the processor implementing the steps of the method generates (or identifies) an arbitrary number of objects (namely, the plurality of objects). Therefore, each of the identified plurality of objects are assessed based on level of accuracy (thus, statistical weight) associated thereto in order to reliably and accurately select ground control points for the said spatial area. Beneficially, such designation of the first feature of the first object as the ground control point is done automatically thereby enhancing accuracy and reducing human error and human effort.

In an example, for a spatial area, the processor selects at most 25 ground control points for every 100 metres of length in the spatial area. In such case, the at most 25 ground control points are selected from a list comprising an arbitrary number of plurality of objects, wherein the plurality of objects are distributed throughout the spatial area. From the plurality of objects, the processor designates at most 25 objects as ground control points in an area of 100 metres, wherein the designated at most 25 objects are selected from an ordered list based on level of accuracy associated therewith. Moreover, herein, the processor rejects objects from the list of plurality of objects having level of accuracy lower than the pre-defined threshold range (low statistical weight).

Notably, the term "machine learning algorithms" refer to a category of algorithms employed by a processing device implementing a software application. The machine learning algorithms allows the processing device to become more accurate in predicting outcomes and/or performing tasks associated with the software application, without being explicitly programmed. Specifically, the machine learning algorithms are employed to artificially train the processing device so as to enable it to automatically learn, from analysing training dataset and improving performance or output from experience, without being explicitly programmed, to efficiently execute software applications.

Optionally, the machine learning algorithms, executed by the processing device, are trained using a training dataset. More optionally, the machine learning algorithms are trained using training dataset comprising labelled data, unlabelled data, or a combination thereof. In this regard, the machine learning algorithms undergo at least one of: unsupervised training, supervised training, reinforced training, semi-supervised training. Furthermore, the machine learning algorithms are trained by interpreting patterns in the training dataset and adjusting the machine learning algorithms accordingly to get a desired output.

Optionally, machine learning algorithms are implemented by the processor to predict a level of accuracy for a distinguishing feature of an object based on measured characteristics associated with the object. Pursuant to embodiment of the present disclosure, the machine learning algorithms are trained in a supervised manner using previously collected training dataset (notably, labelled dataset) to predict the level of accuracy for each of the plurality of objects.

Optionally, the method further comprises utilizing a machine learning module for a prediction of a future level of accuracy for the first feature of the first object. Notably, the machine learning module refers to a processing device capable of (and configured to) executing machine learning algorithms, wherein the machine learning module executes trained machine learning algorithms or trains the machine learning algorithms using training dataset. It will be appreciated that the future level of accuracy for the first feature of the first object is predicted for a time in the future. Moreover, the prediction is based on realised changed conditions from a past time to the present time. In this regard, the future level of accuracy is indicative of an impact on the first object due to (a) change in time, and thus, (b) change in conditions (for example, environmental, logistical, and the like) associated with the first object. Optionally, the future level of accuracy for the first feature of the first object is predicted if the calculated level of accuracy of the first feature of the first object is higher than the pre-defined threshold range thereby making the first feature of the first object as probable ground control point for the spatial area. Beneficially, predicting the future level of accuracy for the first feature of the first object ensures longevity of the probable ground control point. Moreover, predicting the future level of accuracy enables identification of more accurate ground control points from the potential plurality of objects.

More optionally, the prediction of the future level of accuracy, for the detected feature of the at least one object designated as the ground control point, is performed based on the statistical weight assigned to the ground control point. In this regard, the machine learning algorithms predict future level of accuracy for at least one object designated as the ground control point. It will be appreciated that the at least one object designated as the ground control point has level of accuracy higher than the pre-defined threshold range. Moreover, the prediction of the future level of accuracy is based on statistical weight of the at least one object, and/or nature of the at least one object. In this example, a man-made structure (for example, an electric pole, a telecom tower, a bridge, and the like) may have a higher future level of accuracy as compared to naturally occurring structures (for example, tree, sand dune, a trail, and the like).

The method comprises storing the ground control point and the level of accuracy for the first feature of the first object. Notably, the first feature of the first object designated as the ground control point of the spatial are is stored in, for example, a database associated with the processor and/or server. Furthermore, optionally, the ground control point (specifically, the first object) is stored using at least one of: the first feature, information associated with the first object in the first and the second geospatial dataset, the first location co-ordinates, the second location co-ordinates, level of accuracy, statistical weight, future level of accuracy. It will be appreciated that there may be a plurality of designated ground control points. Thus, each of the plurality of ground control points are stored using information related thereto.

Optionally, the method further comprises updating the statistical weight assigned to the ground control point by estimating a spatial relation between the ground control point and the within the detected first feature of the first object within the second geospatial dataset. It will be appreciated that the data collecting device is made to travel the spatial area in time intervals, in order to keep designated ground control points up to date. Such updating of the ground control points is performed in a time interval, for example, T3 after the time interval T2. Moreover, the update of the statistical weight of the ground control points is performed based on measured characteristics by the data collecting means during time interval T3. In an example, the first object in a rock, and the first feature is height of the rock. In such case, if the rock has been defaced, destructed, or displaced due to a landslide, after the designation of the rock as the ground control point, the level of accuracy for the rock is decreased by the processor from a previously calculated level of accuracy, and the processor updates statistical weight of the rock (the ground control point) another value as will be explained in embodiments later herein.

Optionally, the method further comprises estimating a trajectory of a vehicle in the spatial area. More optionally, the ground control points designated by the processor in the spatial area are employed to define the trajectory (namely, a route to be followed) for the vehicle to enable the vehicle to travel in the spatial area. More optionally, estimating the trajectory of the vehicle further comprises using one or more designated ground control points. Herein, the trajectory may be provided to a user of the vehicle via a display of a user device. Moreover, the trajectory of the vehicle is provided to the user via audio, video or pictorial representation. It will be appreciated that the designated ground control points are employed to provide the trajectory of the vehicle to the user thereof. The estimated trajectory of the vehicle may be an actual trajectory of the data collecting device comprising georeferencing based on the designated ground control points thereby having a higher accuracy as compared to conventional methods and systems of trajectory estimation. The estimated trajectory of the vehicle refers to a measured route of travel; that is defined by the processor based on data collected by the data collecting means of the data collecting device or estimated by the server during actual route of travel by the data collecting device.

Beneficially, using the one or more designated ground control points, the trajectory of the vehicle can be estimated for areas, such as, urban areas, forest areas, and mountainous areas, where there are limitations in global navigation satellite system signal reception. The trajectory of the vehicle is estimated by correlating planned route of the data collecting device, actual route of the data collecting device, previously known ground control points, the designated ground control points. Optionally, the previously known ground control points and/or the designated ground control points include automatically created ground control points and manually created ground control points, if any. Thereafter, optionally, a spatial relation between the detected distinguishing feature and the corresponding ground control point is estimated, and an accuracy of the estimated spatial relation is also validated. For example, in order to assess features (or specifically to assess the structural changes in features) in power line structures, growth of trees, vegetation management, such as a tree pruning analysis, correlating of the detected individual feature of each object and ground control points is performed, and the accuracy (e.g. indicated as a distance, for example, 5 cm or 10 cm) of the estimated spatial relation is also validated. Thereafter, a correction is executed based on the estimation of the spatial relation between the detected individual feature (e.g. the first feature of the first object) and the corresponding designated ground control point. In an implementation, the trajectory estimation is executed by using a combination of the measurements from the global navigation satellite system receiver and the inertial measurement unit of the data collecting device, and the spatial relation to ground control points and further using the executed correction in a single integrated process.

Optionally, the method further comprising:

adjusting the pre-defined threshold based on the measurements from at least one of: the ground navigation satellite system receiver and the inertial measurement unit of the data collecting device; and updating, the designated ground control point, based on the adjusted pre-defined threshold.

In this regard, the method comprises adjusting the pre-defined threshold based on the measurements from at least one of: the global navigation satellite system receiver and the inertial measurement unit of the data collecting device.

The method further comprises updating, the designated ground control point, based on the adjusted pre-defined threshold. The pre-defined threshold is adjusted (i.e. increased or reduced) based on the measurements from either the global navigation satellite system receiver or the inertial measurement unit of the data collecting device, or a combination of the global navigation satellite system receiver and the inertial measurement unit. In an example, the measurements may be carried out at different measurement cycles (i.e. at a different time interval or date). Often, a repetitive measurement is performed at certain time intervals (e.g. annually or quarterly inspections of infrastructure, or on demand) for a project site of interest (namely, spatial area) (e.g. a plot of land measured in a city or a forest area). In such cases, variations related to distinguishing features of different objects (e.g. the first feature of the first object) are detected. For example, a change in a position, a height, a size of each object of the plurality of objects, an availability of the objects, and other changes as compared to the previous measurements. Optionally, based on such detected variations and the measurements from the global navigation satellite system receiver or the inertial measurement unit of the data collecting device, the pre-defined threshold is adjusted so that the level of accuracy associated with the first feature is also adjusted (i.e. increased or decreased for a given feature of a given object, such as the first object). Based on the adjusted pre-defined threshold, the method further comprises updating the designated ground control point. The update of the designated ground control point means removal or addition of new ground control points. For example, as and when new data sets become available (e.g. the second geospatial dataset or subsequent geospatial datasets at different measurement cycles), the previously designated ground control points, which are no longer available or accurate enough are removed. The previously designated ground control points are removed that are without a corresponding feature (e.g. when new data sets become available, it was detected that a feature, such as a fence surrounding a tree was removed). In another example, after the adjustment of the pre-defined threshold, certain previously designated ground control points potentially may not meet a selection criterion in terms of calculated level of accuracy for such previously designated ground control points. Thus, such previously designated ground control points which do not meet the selection criterion (i.e. calculated level of accuracy is less than the adjusted pre-defined threshold), are then removed, and no longer designated as ground control points.

Additionally, optionally, the method further comprises optimizing the estimated trajectory of the vehicle, by utilizing the ground control point based on the adjusted pre-defined threshold. The more accurate and up-to-date are the designated ground control points, the more accurate is the trajectory estimation that uses such designated ground control points. Thus, using the updated ground control points, the estimated trajectory of the vehicle is optimized (i.e. accuracy further improved) even for the environments, such as in urban, forest, and mountainous areas, where there are limitations in global navigation satellite system signal reception.

DETAILED DESCRIPTION OF THE DRAWINGS

Figure 1A:
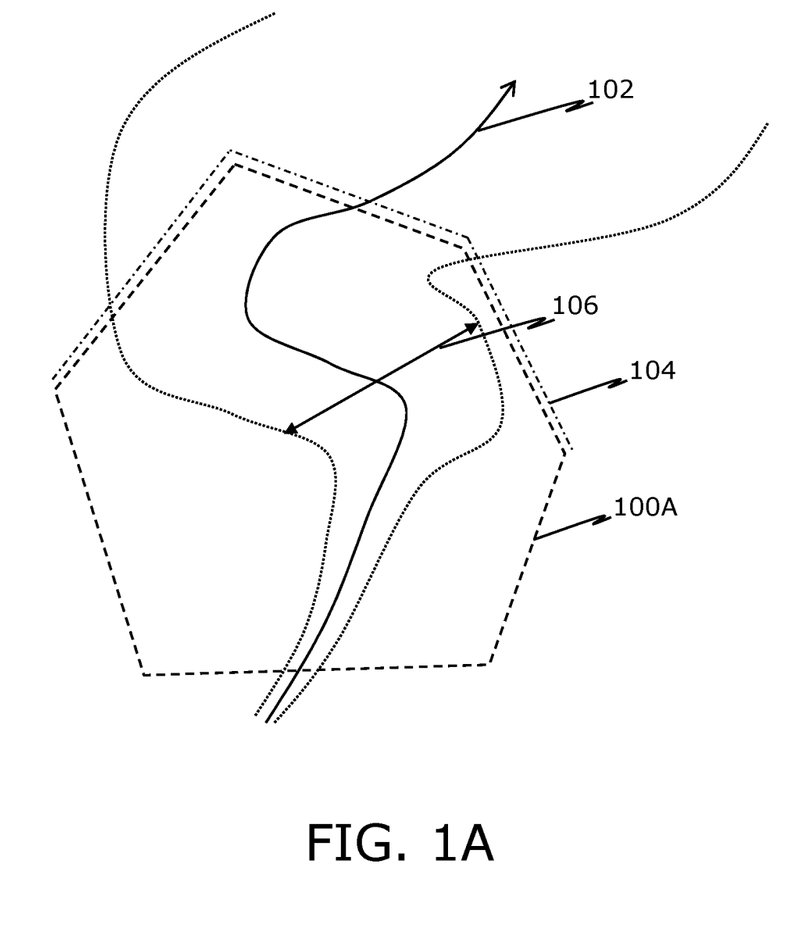
FIG. 1A is an example of a trajectory of a vehicle in a spatial area based on inputs from global navigation satellite system.

Referring to FIG. 1A, there is shown an example of a trajectory of a vehicle in a spatial area 100A wherein a movement of the vehicle is based on inputs from global navigation satellite system (GNSS). There is shown an actual trajectory 102 of the vehicle. An inertial measurement unit of the vehicle starts drifting without continuous GNSS inputs in GNSS denied environments 104 without corrections. As shown, in such GNSS denied environments 104 there is an uncertainty of the trajectory 106 of the vehicle due to drift in the inertial measurement unit. In an example, the uncertainty may be large such as more than 100 meters. As a result, there is inaccuracy in the movement of the vehicle in such environments. However, this problem is overcome using the system and the method discussed in the present disclosure.

Figure 1B:
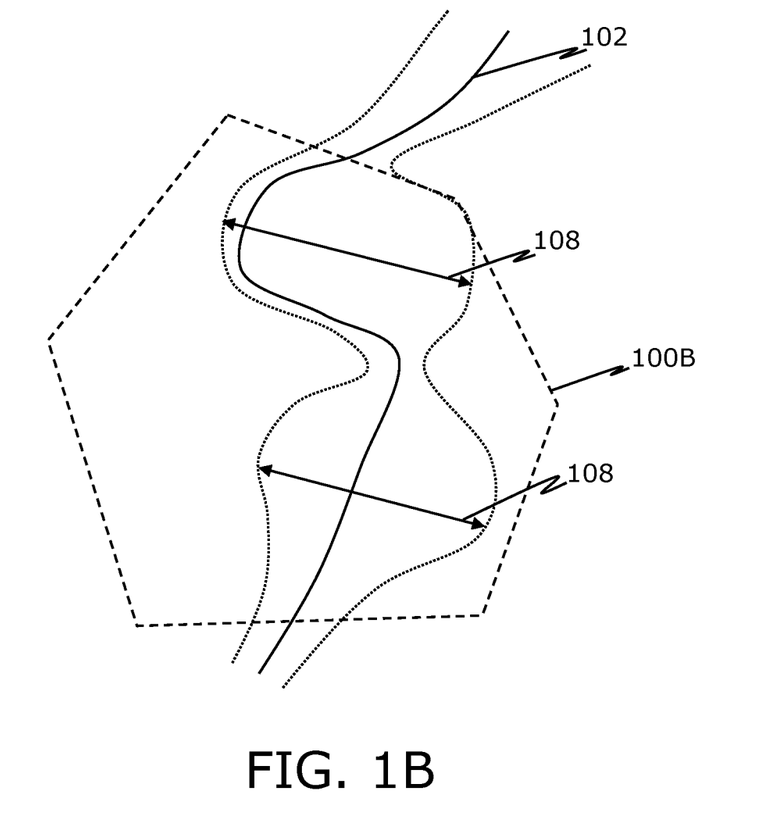
FIG. 1B is an example of a trajectory of a vehicle in a spatial area based on limited ground control points.

Referring to FIG. 1B, there is shown an example of a trajectory of a vehicle in a spatial area 100B wherein a movement of the vehicle is based on less ground control points (GCP). An inertial measurement unit of the vehicle starts drifting due to less GCP in environments 108. Moreover, there is poor accuracy of trajectory of the vehicle in such environments 108. As a result, there is inaccuracy in the movement of the vehicle. However, this problem is overcome using the system and the method discussed in the present disclosure.

Figure 2:
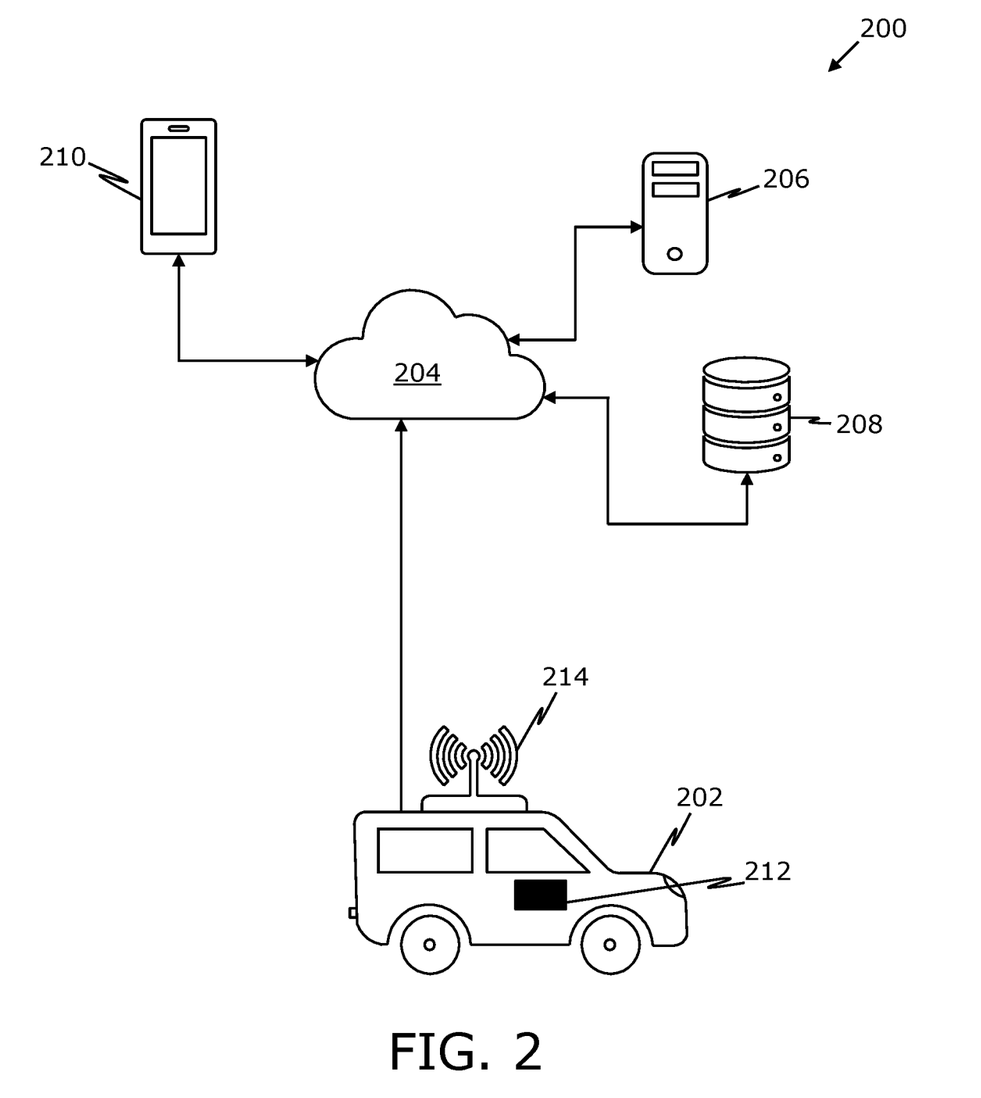
FIG. 2 is a schematic illustration of a system for creating a ground control point within a spatial area, in accordance with an embodiment of the present disclosure.

Referring to FIG. 2, there is shown a schematic illustration of a system 200 for creating a ground control point within a spatial area, in accordance with an embodiment of the present disclosure. The system 200 comprises a data collecting device 202 (for example a vehicle), a communication network 204, a server 206, a database 208, and a user device 210. The data collecting device 202 comprises a processor 212 and a data collecting means 214. The processor 212 is configured to process and create the ground control point. The database 208 is configured to store the ground control point.

Figure 3A:
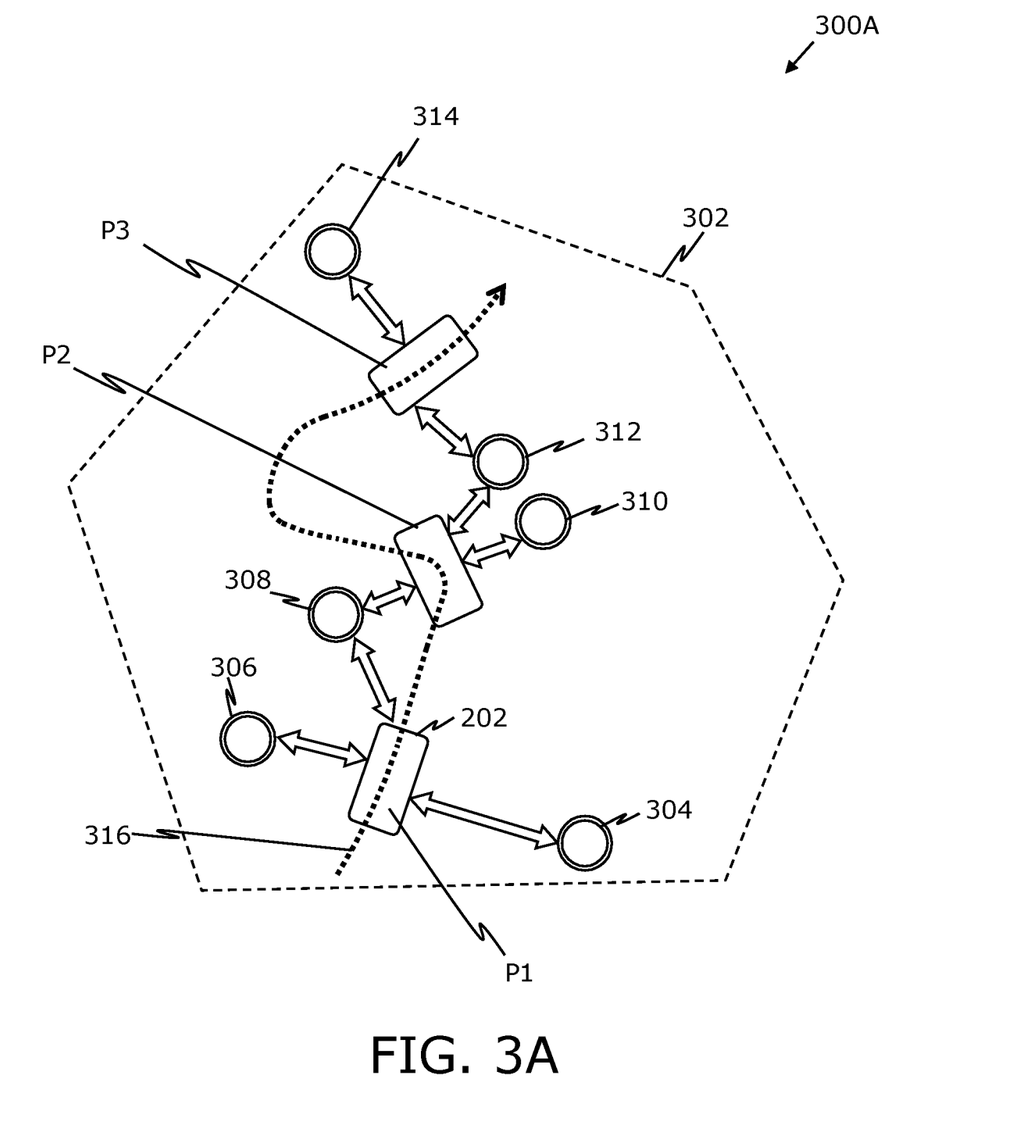
FIG. 3A is an exemplary scenario for implementation of a system for creating a ground control point within a spatial area, in accordance with an embodiment of the present disclosure.

Referring to FIG. 3A, there is shown an exemplary scenario for implementation of a system 300A for creating a ground control point (GCP) within a spatial area 302, in accordance with an embodiment of the present disclosure. The system 300A comprises the data collecting device 202. In the system 300A, the data collecting device 202 is implemented as a rover. Moreover, spatial area 302 comprises a plurality of objects depicted as objects 304, 306, 308, 310, 312 and 314. Furthermore, the data collecting device 202 has a trajectory 316. It may be noted that the FIG. 3A is representative of the trajectory 316 of the data collecting device 202 in a first geospatial dataset. A first feature of each object 304-314 is detected by the system 300A in the first geospatial dataset. In the exemplary scenario, when an instantaneous position of the data collecting device 202 is P1, the data collecting device 202 transmits first location co-ordinates pertaining to objects 304, 306 and 308 via the communication network 204 to the server 206. Moreover, when an instantaneous position of the data collecting device 202 is P2, the data collecting device 202 transmits first location co-ordinates pertaining to objects 308, 310 and 312 to the server 206. Moreover, when an instantaneous position of the data collecting device 202 is P3, the data collecting device 202 transmits first location co-ordinates pertaining to objects 312 and 314 to the server 206. The data collecting device 202 may also be configured to perform a number of measurements for each object 304-312 such that the number of measurements being performed by the data collecting device 202 may be based on a first feature detected for each object 304-212.

Figure 3B:
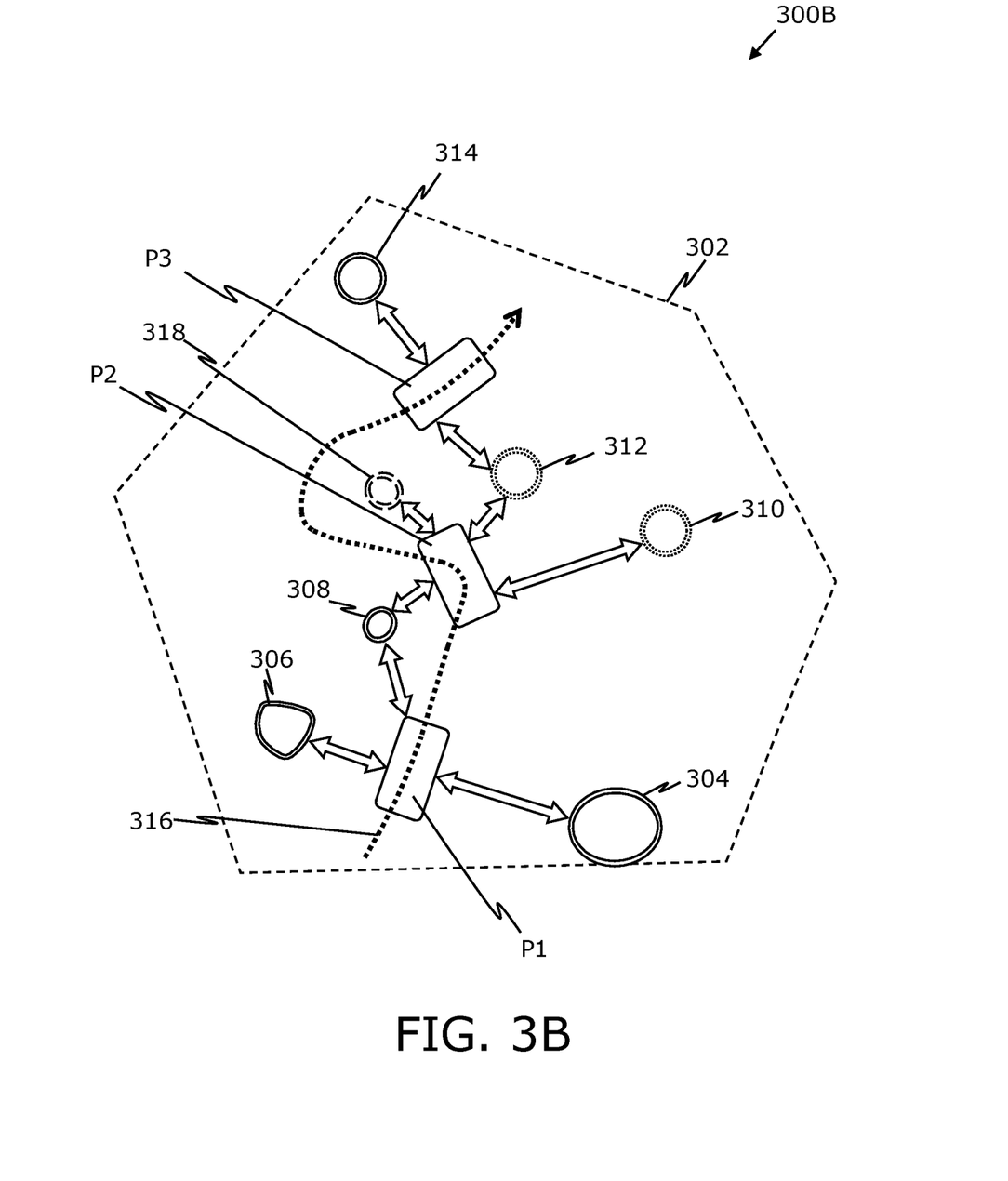
FIG. 3B is an exemplary scenario for implementation of a system for creating a ground control point within a spatial area, in accordance with another embodiment of the present disclosure.

Referring to FIG. 3B, there is shown an exemplary scenario for implementation of a system 300B for creating a ground control point (GCP) within a spatial area 302, in accordance with an embodiment of the present disclosure. It may be noted that the FIG. 3B is representative of the trajectory 316 of the data collecting device 202 in a second geospatial dataset different from the first geospatial dataset. A first feature of each object 304-314 is detected by the system 300B in the second geospatial dataset. The data collecting device 202 detects the objects 304-314 and transmits second location co-ordinates pertaining to objects 304-314 to the server 206 for the positions P1, P2 and P3. In the exemplary scenario, at position P1 the data collecting device 202 has detected that the objects 304, 306 and 308 have an altered characteristic, for instance, a change in the geometry i.e., size and/or shape of the objects 304, 306 and 308. At position P2, the data collecting device 202 has detected that the objects 310 and 312 are no longer present in the same position in the spatial area 302 as in case of first geospatial dataset. Furthermore, at position P2, the data collecting device 202 has also detected the presence of another object 318. Furthermore, at position P3, the data collecting device 202 has detected no change in the object 314. Moreover, the data collecting device 202 calculates a level of accuracy for the first feature of the objects 304-314 by using the first location co-ordinates and the second location co-ordinates. Furthermore, the data collecting device 202 designates the first feature of the objects 304-314 as the ground control point.

It may be understood by a person skilled in the art that the FIGS. 3A and 3B depict the simplified illustration of the system 300A and 300B for creating ground control point (GCP) within spatial area for the sake of clarity only, which should not unduly limit the scope of the claims herein. The person skilled in the art will recognize many variations, alternatives, and modifications of embodiments of the present disclosure.

Figure 4:
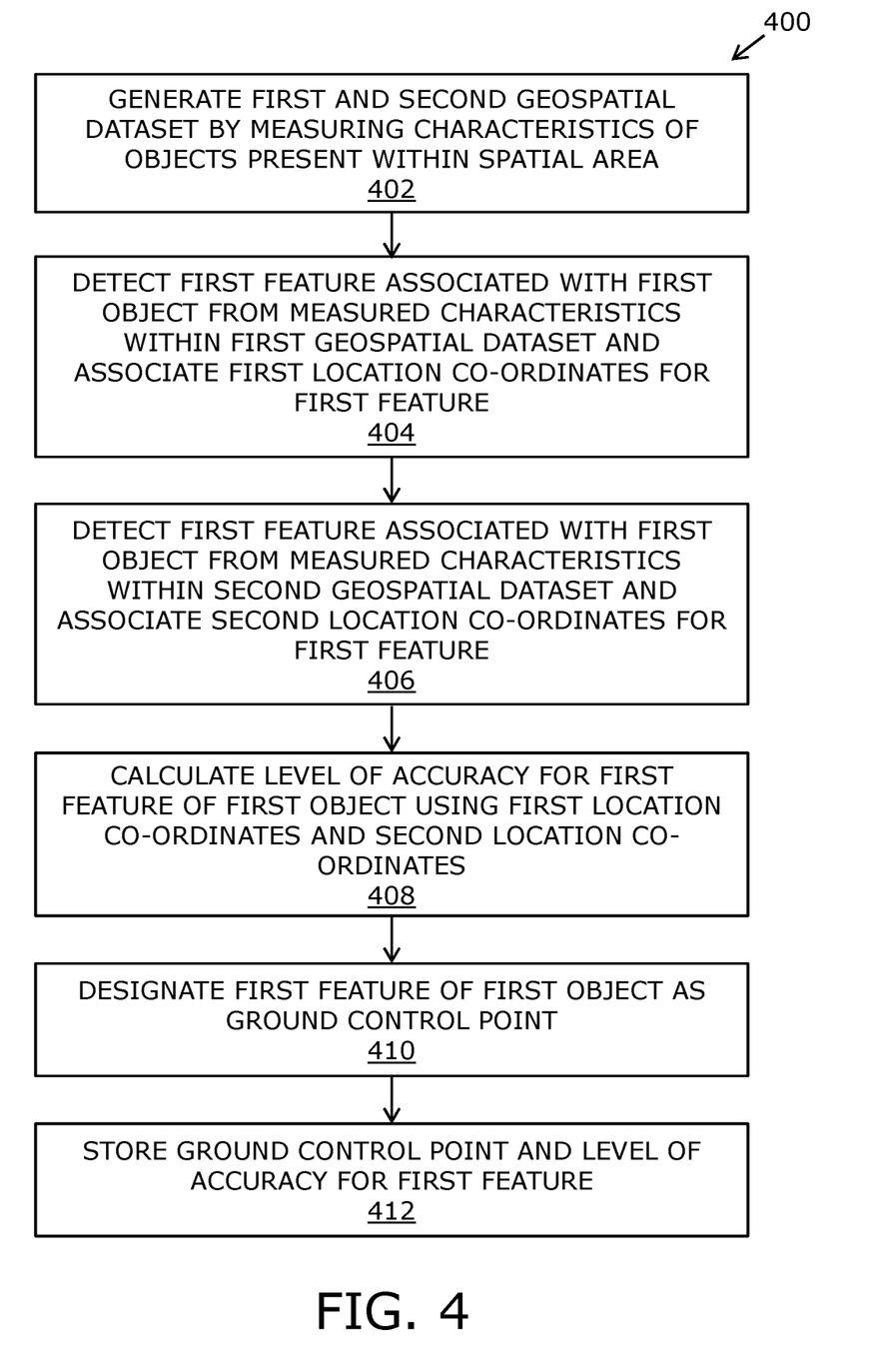
FIG. 4 is a flowchart of a method for creating a ground control point within a spatial area, in accordance with an embodiment of the present disclosure.

Referring to FIG. 4, there is shown a flowchart of a method 400 for creating a ground control point within a spatial area, in accordance with an embodiment of the present disclosure. At a step 402, a first and a second geospatial dataset is generated by measuring a characteristics of a plurality of objects present within the spatial area. At a step 404, a first feature associated with a first object is detected from the measured characteristics of the plurality of objects within the first geospatial dataset. Moreover, first location co-ordinates are associated for the first feature. At a step 406, the first feature associated with the first object is detected from the measured characteristics of the plurality of objects within the second geospatial dataset. Moreover, second location co-ordinates are associated for the first feature. At a step 408, a level of accuracy is calculated for the first feature of the first object by using the first location co-ordinates and the second location co-ordinates. At a step 410, the first feature of the first object is designated as the ground control point. At a step 412, the ground control point and the level of accuracy for the first feature of the first object is stored.

The steps 402, 404, 406, 408, 410 and 412 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for creating a ground control point within a spatial area, the method comprising:
    generating a first and a second geospatial dataset by measuring a characteristics of a plurality of objects present within the spatial area;
    detecting a first feature associating with a first object from the measured characteristics of the plurality of objects within the first geospatial dataset and associating a first location co-ordinates for the first feature;
    detecting the first feature associating with the first object from the measured characteristics of the plurality of objects within the second geospatial dataset and associating a second location co-ordinates for the first feature;
    calculating a level of accuracy for the first feature of the first object by using the first location co-ordinates and the second location co-ordinates;
    designating the first feature of the first object as the ground control point; and
    storing the ground control point and the level of accuracy for the first feature of the first object.

2. The method according to claim 1, wherein the method further comprises:
    comparing the level of accuracy for the first feature of the first object with a pre-defined threshold range;
    based on the comparison, assigning a statistical weight, to the ground control point, wherein the statistical weight corresponds to a difference between the level of accuracy and the pre-defined threshold.

3. The method according to claim 1, wherein the method further comprises, removing the stored ground control point, if at least one of:
    the first feature of the first object is absent from the second geospatial datasets, or
    the level of accuracy associated with the first feature is less than the pre-defined threshold.

4. The method according to claim 1, wherein the method further comprises utilizing a machine learning module for a prediction of a future level of accuracy for the first feature of the first object.

5. The method according to claim 4, wherein the prediction of the future level of accuracy, for the detected feature of the at least one object designated as the ground control point, is performed based on the statistical weight assigned to the ground control point.

6. The method according to claim 1, wherein the method further comprises updating the statistical weight assigned to the ground control point by estimating a spatial relation between the ground control point and the within the detected first feature of the first object within the second geospatial dataset.

7. The method according to claim 1, wherein the method further comprises estimating a trajectory of a vehicle in the spatial area.

8. The method according to claim 7, wherein estimating the trajectory of the vehicle further comprises using one or more designated ground control points.

9. The method according to claim 1, wherein the measuring comprises utilizing, a measurements from at least one of a data collecting means; a ground navigation satellite system receiver, Lidar, camera, an inertial measurement unit of the data collecting device.

10. The method according to claim 1, wherein the method further comprises:
    adjusting the pre-defined threshold based on the measurements from at least one of: the ground navigation satellite system receiver and the inertial measurement unit of the data collecting device; and
    updating, the designated ground control point, based on the adjusted pre-defined threshold.

11. The method according to claim 10, wherein the method further comprises optimizing the estimated trajectory of the vehicle, by utilizing the ground control point based on the adjusted pre-defined threshold.

12. A system for creating a ground control point within a spatial area, the system comprises a data collecting device comprising a data collecting means; a server; a processor, wherein the processor is configured to:
    generate a first and a second geospatial dataset by measuring a characteristics of a plurality of objects present within the spatial area;
    detect a first feature associating with a first object from the measured characteristics of the plurality of objects within the first geospatial dataset and associating a first location co-ordinates for the first feature;
    detect the first feature associating with the first object from the measured characteristics of the plurality of objects within the second geospatial dataset and associating a second location co-ordinates for the first feature;
    calculate a level of accuracy for the first feature of the first object by using the first location co-ordinates and the second location co-ordinates;
    designate the first feature of the first object as the ground control point; and
    store, the ground control point and the level of accuracy for the feature of the first object.

13. The system according to claim 12, wherein the processor is further configured to:
    compare the level of accuracy for the first feature of the first object with a pre-defined threshold;
    based on the comparison, assign a statistical weight to the ground control point, wherein the statistical weight corresponds to a difference between the level of accuracy and the pre-defined threshold.

14. The system according to claim 13, wherein the processor is further configured to: remove the stored ground control point, if at least one of:

the first feature of the first object is absent from the second geospatial datasets, or the level of accuracy associated with the first feature is less than the pre-defined threshold.

15. The system according to claim 12, wherein the processor is at least one of: a processor of the data collecting device, a processor arranged in the server, a separate processor arrangement connected to the system.

* * * * *